United States Patent
Bruley et al.

(10) Patent No.: US 8,741,713 B2
(45) Date of Patent: Jun. 3, 2014

(54) RELIABLE PHYSICAL UNCLONABLE FUNCTION FOR DEVICE AUTHENTICATION

(75) Inventors: John Bruley, Poughkeepsie, NY (US); Vijay Narayanan, New York, NY (US); Dirk Pfeiffer, Croton on Hudson, NY (US); Jean-Oliver Plouchart, New York, NY (US); Peilin Song, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/572,245

(22) Filed: Aug. 10, 2012

(65) Prior Publication Data
US 2014/0042442 A1    Feb. 13, 2014

(51) Int. Cl.
*H01L 21/336* (2006.01)

(52) U.S. Cl.
USPC .......... 438/257; 257/639; 257/E27.098; 257/E29.309; 438/216; 438/287

(58) Field of Classification Search
None
See application file for complete search history.

(56) References Cited

U.S. PATENT DOCUMENTS

| | | | |
|---|---|---|---|
| 7,653,197 B2 | 1/2010 | Van Dijk | |
| 7,681,103 B2 | 3/2010 | Devadas | |
| 7,741,721 B2 | 6/2010 | Black | |
| 7,868,606 B2 | 1/2011 | Meterelliyoz | |
| 7,898,283 B1 | 3/2011 | Koushanfar | |
| 8,054,098 B2 | 11/2011 | Koushanfar | |
| 8,214,777 B2 | 7/2012 | Joshi | |
| 8,347,091 B2 | 1/2013 | Nonaka | |
| 2006/0221686 A1* | 10/2006 | Devadas et al. | 365/185.03 |
| 2007/0038871 A1 | 2/2007 | Kahlman | |
| 2008/0231418 A1 | 9/2008 | Ophey | |
| 2008/0256600 A1 | 10/2008 | Schrijen | |
| 2008/0258216 A1* | 10/2008 | Kikuchi | 257/344 |
| 2009/0083833 A1 | 3/2009 | Ziola | |
| 2009/0153841 A1 | 6/2009 | Ophey | |
| 2010/0090714 A1* | 4/2010 | Van Geloven et al. | 324/705 |
| 2010/0127822 A1 | 5/2010 | Devadas | |
| 2010/0193875 A1* | 8/2010 | Lee et al. | 257/369 |
| 2011/0254141 A1* | 10/2011 | Roest et al. | 257/639 |
| 2011/0317829 A1 | 12/2011 | Ficke et al. | |

FOREIGN PATENT DOCUMENTS

| | | |
|---|---|---|
| WO | WO 2005/041000 A1 | 5/2005 |
| WO | WO 2006/021911 A1 | 3/2006 |

OTHER PUBLICATIONS

Dries Schellekens et al., "Embedded Trusted Computing with Authenticated Non-volatile Memory," Lecture Notes in Computer Science, 2008, vol. 4968, Trusted Computing—Challenges and Applications, pp. 60-74.

(Continued)

*Primary Examiner* — Julio J Maldonado
*Assistant Examiner* — Joseph Galvin, III
(74) *Attorney, Agent, or Firm* — Louis Percello

(57) ABSTRACT

The present disclosure relates to a secure device having a physical unclonable function and methods of manufacturing such a secure device. The device includes a substrate and at least one high-k/metal gate device formed on the substrate. The at least one high-k/metal gate device represents the physical unclonable function. In some cases, the at least one high-k/metal gate device may be subjected a variability enhancement. In some cases, the secure device may include a measurement circuit for measuring a property of the at least one high-k/metal gate device.

23 Claims, 4 Drawing Sheets

(56) References Cited

OTHER PUBLICATIONS

Sean Smith et al., Building a High-Performance, Programmable Secure Coprocessor, IBM Research Report, Computer Science/Mathematics, RC 21102 (94393) Feb. 19, 1998. Total of 60 pages.
G. Edward Suh et al., "Physical Unclonable Functions for Device Authentication and Secret Key Generation," DAC 2007, Jun. 4-8, 2007, San Diego, California, coy consists of 6 unnumbered pages.
Tsutomu Matsumoto et al., "Studying LSI Tamper Resistance with Respect to Techniques Developed for Failure Analysis," Matsumoto-Nakajima-Shibata-Yamagishi, Physical Security Testing Workshop, Hawaii, Sep. 26-29, 2005.
Sergei P. Skorobogatov et al., "Optical Fault Induction Attacks," In Proceedings of CHES '02 Revised Papers from the $4^{th}$ International Workshop on Cryptographic Hardware and Embedded Systems, pp. 2-12, 2003.
Luke Teyssier, "Strong Encryption and Correct Design are not Enough: Protecting Your Secure System from Side Channel Attacks," DesignCon 2010, pp. 1-18.
Travis Spann, "Fault Induction and Environmental Failure Testing," NIST CMVP Physical Security Conference, Sep. 16, 2005, pp. 1-11.
M. Breitwisch, "Novel Lithography-Independent Pore Phase Change Memory," 2007 Symposium on VLSI Technology Digest of Technical Papers, pp. 100-101.
James S. IM, "Single-crystal Si films for thin-film transistor devices," Appl. Phys. Lett. 70 (25) Jun. 23, 1997, 1997 American Institute of Physics, pp. 3434-3436.
Oliver Kommerling et al., "Design Principles for Tamper-Resistant Smartcard Processors," Proceedings of the USENIX Workshop on Smarcard Technology (Smartcard '99), Chicago, Illinois, May 10-11, 1999, USENIX Association, pp. 9-20.
Mesut Meterelliyoz, et al., "A High Sensitivity Process Variation Sensor Utilizing Sub-threshold Operation," IEEE 2008 Custom Intergrated Circuits Conference (CICC), pp. 125-128.
Peter Gutmann, "Data Remanence in Semiconductor Devices," In Proceedings of the $10^{th}$ conference on USENIX Security Symposium—pp. 1-19.
Belyansky et al., "Low Temperature Borophosphosilicate Glass (BPSG) Process for High Aspect Ratio Gap Fill"—Electronics Soc. 146, 5, 1999—1 page.
McIntyre et al., "Interface Layers for High-k/Ge Gare Stacks: Are they Necessary?" ECS Transactions, 3 (7) (2006) Copyright the Electrochemical Society pp. 519-530.
S. Cho, "Technical Challenges in TSV Integration to Si", Sematech Symposium Korea, Oct. 27, 2011, consists of cover page and page Nos. 1-33.
PCT Search Report and Written Opinion for International Application Serial No. PCT/US13/54156, dated Aug. 30, 2013, consists of 13 unnumbered pages.

* cited by examiner

RELIABLE PHYSICAL UNCLONABLE FUNCTION FOR DEVICE AUTHENTICATION

FIELD OF THE DISCLOSURE

The present disclosure relates to device authentication, and more particularly to physical unclonable functions for integrated circuits.

BACKGROUND OF THE DISCLOSURE

Hardware based "Root of Trust" is a fundamental building block for any secure computing system. Key elements of secure computing require authentication, sending data to an authorized source, and/or loading data onto a designated device. In general, cryptographic keys in binary code form the basis of securing data and bit streams. Typically, such cryptographic keys are stored in non-volatile memory and are present on an integrated circuit (IC) at all times. If an attacker can extract the key from a device, the entire foundation for secure computing is in jeopardy. For example, an attacker with physical access to the device can delayer a chip, and read out the stored code based on the state of the transistors. Thus, securing cryptographic keys requires anti-tamper technologies, which may be relatively expensive and may therefore not be suitable for implementation in various devices like field programmable gate arrays (FPGAs), mobile devices, and sensors.

SUMMARY OF THE DISCLOSURE

Embodiments of the present disclosure disclose secure devices and methods for manufacturing such devices having physical unclonable functions. For example, in one embodiment a secure device having a physical unclonable function includes a substrate, at least one high-k/metal gate device formed on the substrate, and a measurement circuit configured to measure at least one property of the at least one high-k/metal gate device for authenticating the secure device. The at least one high-k/metal gate device represents the physical unclonable function. Similarly, in another embodiment a secure device having a physical unclonable function includes a substrate and at least one high-k/metal gate device formed on the substrate, the high-k metal gate device representing the physical unclonable function, where the at least one high-k/metal gate device has been subjected to at least one variability enhancement.

In a further embodiment, a method of manufacturing a secure device having a physical unclonable function includes providing a substrate and forming at least one high-k/metal gate device on the substrate, the at least one high-k/metal gate device representing the physical unclonable function. Forming the high-k/metal gate device includes applying at least one variability enhancement to the at least one high-k/metal gate device. In still another embodiment, a method of manufacturing a secure device having a physical unclonable function includes providing an integrated circuit having at least one high-k/metal gate device and including a measurement circuit on the integrated circuit that is configured to measure at least one property of the at least one high-k/metal gate device for authenticating the secure device. The at least one high-k/metal gate device represents the physical unclonable function.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the Figures.

DETAILED DESCRIPTION

Figure 1:
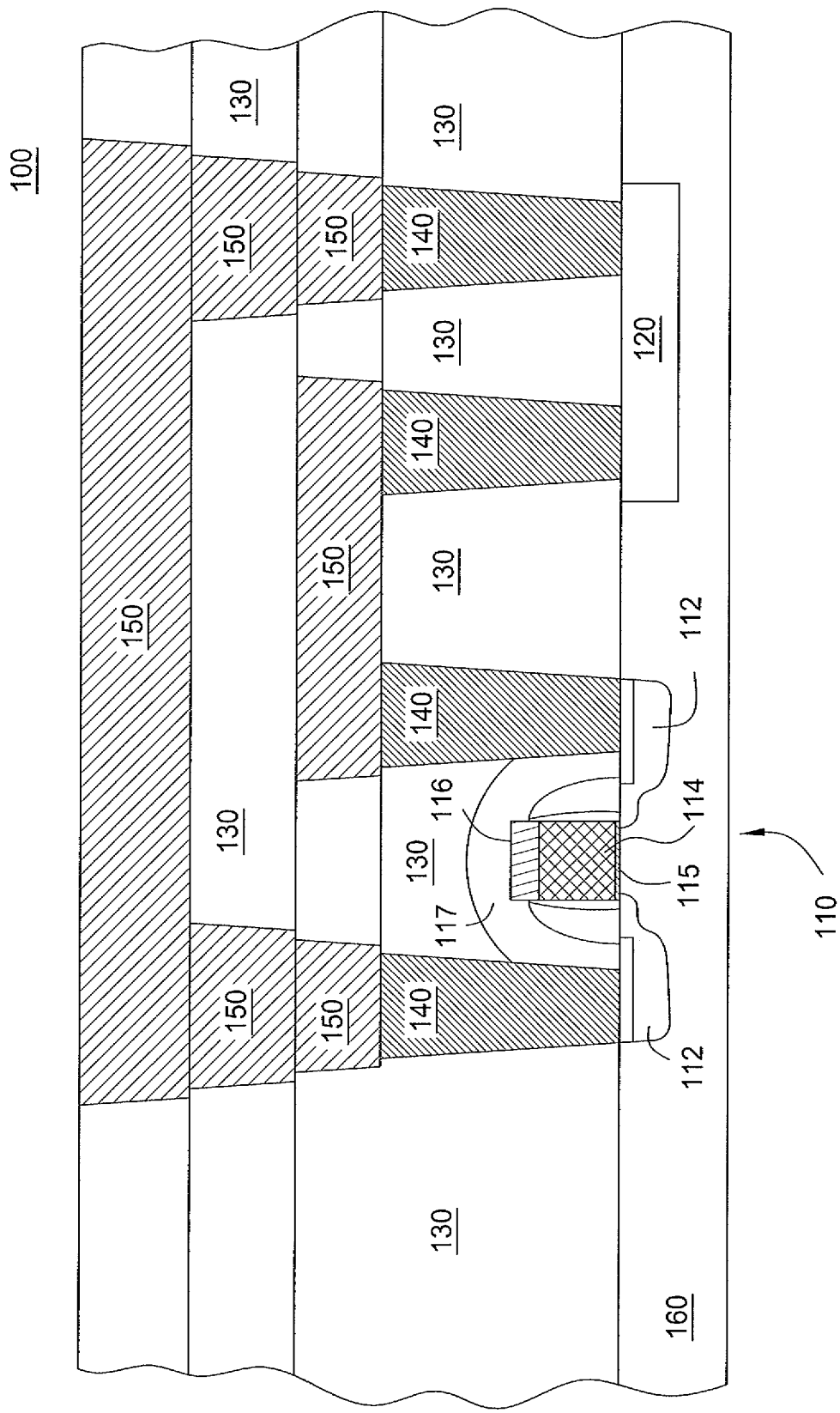
FIG. 1 illustrates an exemplary device, according to embodiments of the present disclosure.

Static random access memory (SRAM) is a key device building block for field programmable gate arrays (FPGAs). Embodiments of the present disclosure present improved physical unclonable functions (PUFs) using novel methods of fabricating and processing the high-k/metal gate stack(s) used in devices of this nature. In particular, several materials-based phenomena are exploited to purposefully influence variability within the gate stack.

In gate first high-k/metal gate fabrication, the threshold voltage of a high-k/metal gate is very sensitive to the local heating environment. For example, $La_2O_3$ and oxides of group IIA, e.g., earth metal oxides (note that group IIA is now sometimes referred to as group 2, alkaline earths, and/or the beryllium group), and group IIIB elements (now sometimes referred to as group 13, earth metal oxides, or the boron group) can be used to precisely engineer the threshold voltage of the gate. However, the threshold voltage of such a high-k/metal gate (e.g., a n-channel or p-channel metal oxide semiconductor field effect transistor (MOSFET)) may exhibit a threshold voltage (Vt) change of up to 200 mV or more for a temperature change between 940 and 1025 degrees Celsius.

Gate first high-k/metal gate devices are very sensitive to the local oxygen environment and there are many deleterious impacts of even part-per-million (ppm) levels of oxygen. Two common impacts of oxygen are interfacial layer regrowth in small and large devices, resulting in Tiny (thickness of the inversion layer) increase and loss of channel control by the gate. In some cases, this is enabled by the oxidation of substrate silicon (Si) at temperatures greater than approximately 500 degrees Celsius from extrinsic oxygen, which may be transported to the active region of a transistor by a hafnium (Hf) based high-k conduit layer being in intimate contact with an interfacial layer. The increases in Tiny in turn increase Vt of the transistor for small length and small width devices upon exposure to ppm levels of oxygen at around 400-500 degrees Celsius or greater.

Gate last high-k/metal gate devices are very sensitive to temperatures above 400° C. In particular, in some embodiments such devices have aluminum or aluminum alloys for the metal gate. These materials are very sensitive to temperature variations. For example, a change from 400 to 450 degrees Celsius can result in significant degradation of gate leakage (e.g., two orders of magnitude or greater) and thereby influence the total device leakage, and hence, Vt.

Localized heating and fabrication in various ambient conditions, in accordance with the above described effects, as well as several other techniques described herein, such as patterning processes, are utilized to engineer a PUF with increased variability as well as sensitivity to tampering.

In addition, a high-k/metal gate is very sensitive towards atmospherics (e.g., exposure from delayering) and radiation (e.g., laser heat, e-beams, X-ray, etc.). Thus, embodiments of the present disclosure employing high-k/metal gate stacks as PUF devices provide a material-based mechanism for tamper response. For example, empirical data derived from failure analysis using a tunneling electron microscope (TEM) show that the high-k/metal gate stack is very beam sensitive and great care has to be taken to avoid beam damage that would alter analysis results.

In accordance with the foregoing, embodiments of the present disclosure disclose secure devices having unique physical properties, or physical unclonable functions (PUFs), for authentication and key generation with several advantages. For example, an exemplary device may include a substrate, die, or integrated circuit, having an array of one or more high-k/metal gates that is used as a physical unclonable function. It should be noted that in this context, the term "high-k" refers to a dielectric constant that is greater than that of silicon dioxide ($SiO_2$) used in standard gates/transistors. In some embodiments, variability in the properties of one or more components of a high-k/metal gate is purposefully increased to create a well defined signature for the physical unclonable function. For instance, one embodiment may increase the variability of a high-k/metal gate by performing a laser anneal during a manufacturing process of the integrated circuit. One embodiment may increase the variability by exposing one or more components of the high-k/metal gate to one or more varying ambient conditions during a manufacturing process and/or performing one or more patterning processes. In some embodiments, a measurement circuit is included on the integrated circuit for purposes of measuring at least one property of the at least one high-k/metal gate. The measured property (or properties) may then be used as a signature for authenticating the device. In other words, the array of high-k/metal gates comprises a physical unclonable function for the device.

One of the principles behind a PUF is that the cryptographic key(s) are not stored in binary form when the chip is powered down but are hidden in form of unique physical analog identifiers within the hardware so that the code can only be executed on a designated authorized uncompromised IC. Thus, when a circuit is turned on, the areas of the chip can be measured and the analog values converted into a binary code. However, if the chip is turned off, the binary code is not stored in any memory, but is implicit in the properties of the chip. Prior approaches to using physical unclonable functions for authentication and key generation focus on device structures that have been optimized during manufacturing to have reduced variability, since the usual intent is high performance and reproducibility. However, if an array of device(s) used to provide a physical unclonable function has a narrow variability range close to a threshold of a measurement device used to compute a binary code from the physical unclonable function, any slight change over time and temperature may result in bit errors. For instance, a threshold can be applied to analog values presenting a physical unclonable function in order to convert the signature to a binary representation. In addition, a circuit may determine whether to categorize various values of the signature as ones or zeroes. In this way, a key, such as in the form of a binary code, can be derived from the signature, the key comprising an identifier that is unique to the device and that can be used for authenticating the device. However, it may be a particular problem when a particular analog value is close to a threshold. If the analog value changes, even slightly, then the signature can change. For instance, the value may be read as a one, whereas it should be read as a zero. It is possible to deal with this problem using bit error correction. However, this may reduce the security of the code because the greater redundancy and error tolerance in the code, the less reliable it is as a security mechanism.

In contrast to the foregoing, various embodiments of the present disclosure purposefully increase the variability in portions of a device used as a physical unclonable function. For instance, novel gate materials may be used to create a physical unclonable function that has several advantages. In various embodiments, a high-k/metal gate is used as the basis for creating a physical unclonable function.

In some embodiments, the variability is created by performing a laser anneal which affects one or more layers of the high-k/metal gate stack. For example, the laser anneal may purposefully induce a high-k dielectric to form variable, or random, patterns of recrystallization or may induce an active region of a substrate to saturate with oxygen. Similarly, in some embodiments, the variability of the physical properties of the gate stack, or one or more components thereof, can be increased through several other patterning processes, such as lithography, reactive ion etching, or chemical mechanical planarization, or by exposure to varying ambient conditions, such as by exposing one or more components of the high-k/metal gate structure to varying levels of dopant, during a manufacturing process of the device. For example, a lithography process can be used to change the range of physical dimensions of structures of the transistor gate. Other purposeful variations such as line edge roughness can be used to increase the physical variations of the transistor structure and therefore lead to an increase in variability of the electrical characteristics of the transistor. Furthermore, this variability can be further enhanced by all subsequent patterning steps (e.g., reactive ion etching and further following steps). Similarly, the level of doping of the source/drain can be varied. In some embodiments, the locations on the die/substrate of high-k/metal gates used for the PUF may also be varied. This is in contrast to the typical manufacturing process, which seeks to provide as uniform conditions as possible in the gate structure to reduce variability and to guarantee uniform, reliable and predictable gate performance.

Compared to prior approaches for physical unclonable functions, embodiments of the present disclosure have a wide range/variability in measurable physical properties (e.g., voltage response, capacitance response, inductance response, etc.), and provide PUFs with greater reliability and with less susceptibility to bit errors. By increasing the variability of the physical properties, the likelihood is reduced that a particular value is at or near a threshold of a measurement device used to compute a binary code from the physical unclonable function. Thus, even if the PUF changes due to temperature or aging, it is less likely that a binary key derived from the PUF will drift significantly over time and temperature. The variability achievable through embodiments of the present disclosure is significant enough to achieve a great number of unique PUFs (in the millions or greater) for a wide variety of devices. In addition, the number of PUF values achievable is large enough avoid attackers guessing specific patterns.

To aid in understanding the present disclosure, FIG. 1 illustrates a cross-section of an exemplary device 100 (e.g., an integrated circuit) related to embodiments of the present disclosure. In particular, device 100 includes a substrate or die 160, which may be comprised of crystalline silicon (Si), germanium (Ge), SiGe, gallium arsenide (GaAs), or other semiconductors, as well as other materials for forming transistors, resistors, capacitors and other structures. Although the example of FIG. 1 refers to a die 160, the present disclosure is not so limited. For example, the die may be one of many dies that may be formed from a common substrate. Thus, embodiments of the present disclosure may incorporate a substrate prior to separation of multiple dies. The die 160, which forms part of the front end of the integrated circuit, may have a number of structures formed thereon, such as an array of one or more high-k/metal gates, as well as a measurement circuit 120 which reads one or more physical properties of the high-k/metal gate(s) used for the PUF, as described in further detail below. As shown in FIG. 1, for ease of understanding there is one high-k/metal gate (or high-k/metal gate device) 110. The high-k/metal gate 110 may comprise an n-type or p-type field effect transistor, or any number of other similar structures. Thus, the high-k/metal gate 110 is shown by way of example only, and not limitation. In any case, the high-k/metal gate 110 comprises a metal gate 116 over a high-k dielectric 114. In some embodiments, the high-k/metal gate 110 may further include an interfacial layer (or interface layer) 115 between the high-k dielectric 114 and the substrate or die 160, source/drain regions 112, one or more protective layers (e.g., stress liner 117), and other components.

The backend of device 100 is a multi-layer interconnect structure which includes wiring for transporting signals between transistors in the front end and supply voltages, ground, and C4s (solder bumps), in the package. For example, the backend of a typical integrated circuit may include insulating materials, e.g., dielectric 130, which may comprise a low-k dielectric material such as borophosphosilicate glass or other low-k materials, and copper (Cu) or tungsten (Tu) wiring formed in vias 140 and traces 150. As shown in FIG. 1, the high-k/metal gate 110 is connected to measurement circuit 120 through wiring connections in the vias 140 and traces 150 in the backend interconnect structure.

According to various embodiments of the present disclosure, one or more high-k/metal gates devices (e.g., gate 110) form the basis for a physical unclonable function. For example, in one embodiment, the measurement circuit 120 may read one or more physical properties of an array of one or more high-k/metal gate devices in order to determine a signature of the physical unclonable function. In the example of FIG. 1, measurement circuit 120 is only shown as being connected to a single high-k/metal gate 110. However, it should be understood that in various embodiments, a measurement circuit may be connected to an array of two or more high-k/metal gate devices, which collectively may be used as a PUF from which a signature may be derived for authenticating a device. Thus, where the following discussion refers to a single high-k/metal gate device, it should be understood that the discussion is equally applicable to arrays of two or more high-k/metal gate devices.

In one embodiment, the measurement circuit 120 may receive PUF values from the high-k/metal gate device 110 (e.g., a voltage response, capacitance response, resistance response, impedance response, a transmittance, or the like). In the embodiment of FIG. 1, the measurement circuit 120 may measure the response of the high-k/metal gate device 110 in the form of Vt (threshold voltage) of the transistor (i.e., high-k/metal gate device 110). In some embodiments, the measurement circuit 120 comprises a voltage controlled ring oscillator. In other embodiments, different forms of on chip measurement circuits may be employed. For example, one such on chip measurement device, or sensing device, is described in U.S. patent application Ser. No. 12/032,100, filed Feb. 15, 2008 (Publication No. 2009/0206821 published Aug. 20, 2009), which is incorporated by reference herein in its entirety. The response of the high-k/metal gate device may be considered a signature of the high-k/metal gate device 110 (in other words, a physical unclonable function).

Figure 4:
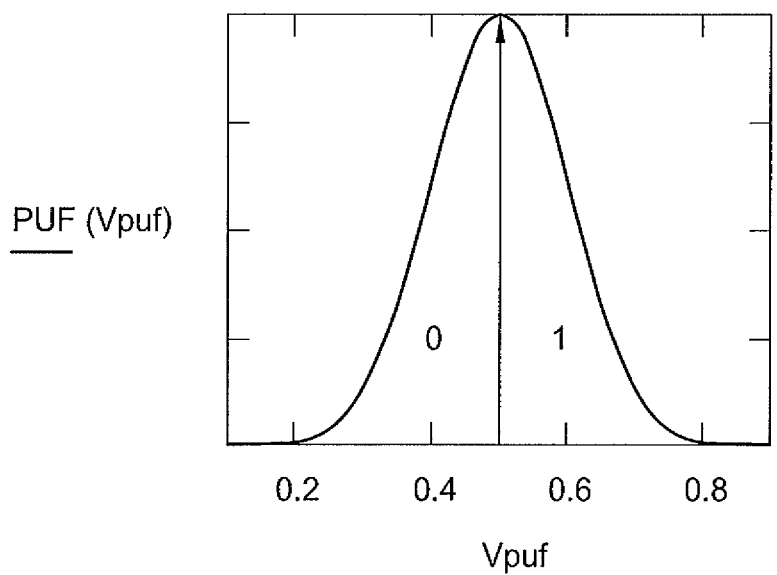
FIG. 4 illustrates an exemplary graph for determining binary keys from physical unclonable function values.

FIG. 4 illustrates an exemplary graph 400 showing a Gaussian distribution of a number of PUF devices (e.g., high-k/metal gate devices) versus PUF values/signature values (in this case observed threshold voltage), and a cutoff for determining binary keys (e.g., ones and zeros) from physical unclonable function values of the PUF devices. In this case, FIG. 4 may illustrate a cutoff of 0.5 for determining whether a particular PUF value of a PUF device is a one or a zero. The horizontal axis represents Vpuf (the PUF value, which in one embodiment may comprise the threshold voltage, Vt, of the PUF device) and the vertical axis represents the number of PUF devices exhibiting the particular PUF value. For example, in a manufacturing process, an ideal PUF device (e.g., high-k/metal gate) may have a threshold voltage of 0.5. Thus, a manufacturer would generally prefer a yield with as many devices having a PUF value as close to 0.5 as possible (i.e., little to no variation). However, by implementing the purposeful variability enhancements of the present disclosure, a wider yield curve may be achieved where many more PUF devices (in this case, high-k/metal gate devices) have PUF values greater than or less than 0.5. Notably, in the example of FIG. 4, the cutoff for determining whether a PUF value is a one or a zero may be 0.5. Any value measured below 0.5 will be categorized as a zero whereas any value measured above 0.5 may be categorized as a one. It should be noted that when the PUF value (Vpuf) is close to the cutoff (e.g., 0.5), changes in temperature and changes over time may cause the PUF value to fluctuate and therefore cause a bit error in the binary key. Thus, the further the PUF value of a particular PUF device can be made away from the cutoff, the less likely it is that time and temperature changes will cause the PUF value to cross the threshold and switch from a zero to a one, or vice versa; hence, the more stable the binary key over time. In addition, although FIG. 4 may relate to PUF values derived from a voltage response (e.g., threshold voltage (Vt)), in other embodiments PUF values may be derived from other measureable properties, such as, resistivity, capacitance, impedance or transmittance, among other things. As such, similar cutoffs may be applied to such other values to distinguish between ones and zeros.

Figure 2:
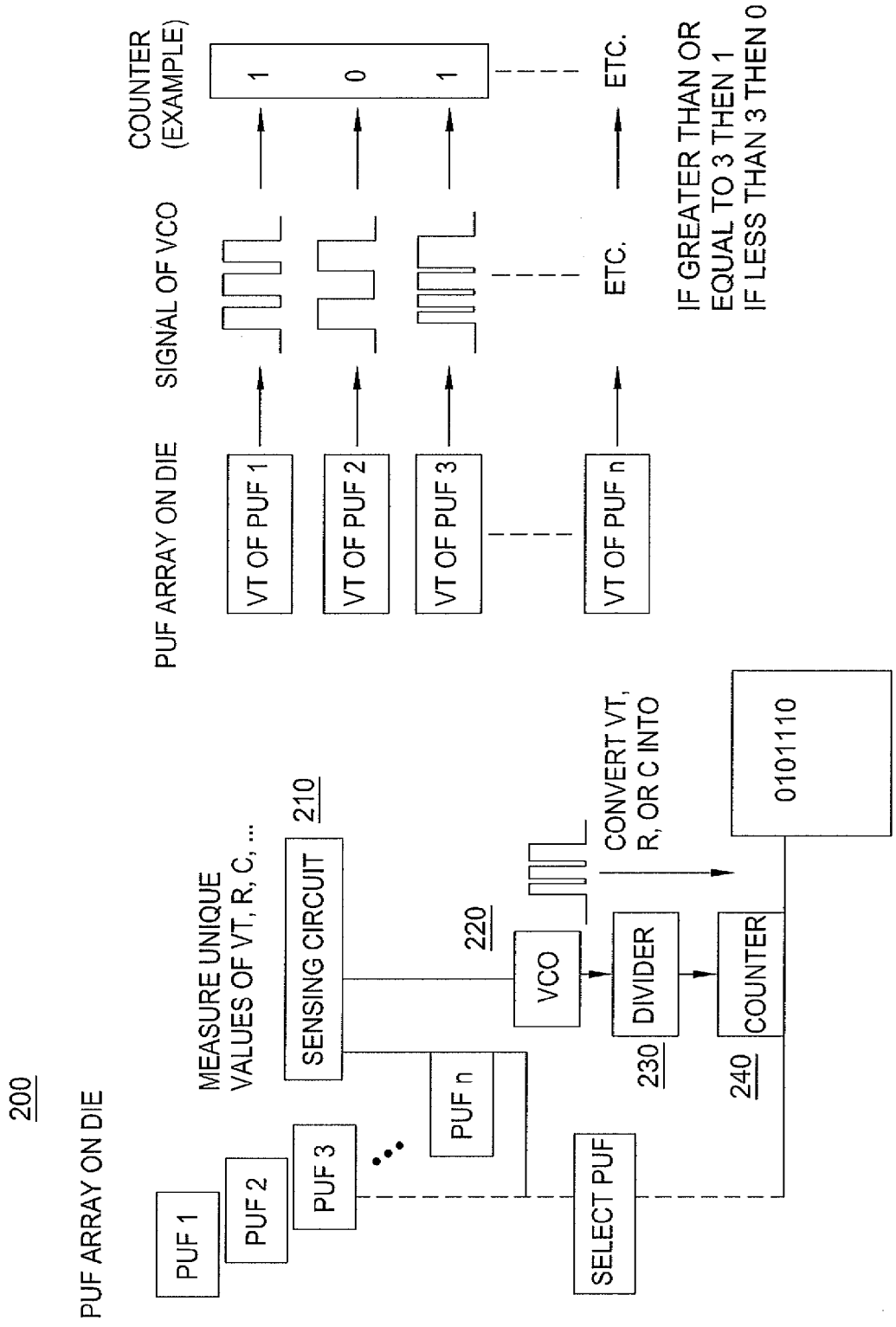
FIG. 2 illustrates the operation of an exemplary measurement circuit, according to embodiments of the present disclosure.

FIG. 2 depicts the operation of an exemplary measurement circuit (e.g., measurement circuit 120 in FIG. 1) according to various embodiments of the present disclosure. In particular, the embodiment of FIG. 2 may comprise an on chip measurement circuit (i.e., located within the integrated circuit itself, such as on a die of the integrated circuit) that is configured to measure a voltage response (e.g., a threshold voltage (Vt)), resistance response, a capacitance response, etc. of one or more high-k/metal gates formed on a substrate (or die/integrated circuit) comprising a physical unclonable function. As shown in the left side of FIG. 2, a measurement circuit 200 includes a sensing circuit 210, a voltage controlled oscillator 220, a divider 230 and a counter 240. In one embodiment, the sensing circuit 210 measures one or more high-k/metal gate devices (e.g., PUF1, PUF2, PUF3 ... PUFn, as shown in FIG. 2). The response(s) of the one or more high-k/metal gates is used by the sensing circuit to convert the PUF value(s) into a voltage value, or values, which will influence the oscillation frequency of the voltage controlled oscillator 220. In some embodiments, the output of the voltage controlled oscillator 220, which may be representative of the PUF value(s) of one or more high-k/metal gate devices being measured, is received by the divider 230. The divider 230 and the counter 240 convert the signal of the voltage controlled oscillator that is influenced by the PUF value via the sensing circuit into a digital value, or binary representation. For example, the PUF value correlates to the period, or the number of cycles/oscillations in a given time, of the voltage controlled oscillator signal 220. The period is observed/determined by the counter 240 in order to decide if a particular PUF value should be categorized as a "1" or a "0". This process is repeated over one or more gate devices to create a binary set. According to various embodiments, this binary set (also referred to herein as a code, or key), is used as a cryptographic key to authenticate a device. Notably, the code is never stored in binary form on the measurement device. It should also be noted that although a binary based key is described, the present disclosure is not so limited. Namely, other, further, and different embodiments may be incorporated in a ternary based system, and the like.

In the right side of FIG. 2, the responses of various individual high-k/metal gate devices are represented by the PUF values Vt of PUF1, Vt of PUF2, etc., in the first column. The PUF values will influence, through the sensing circuit 210, the number of oscillation periods produced by the voltage controlled oscillator 220, which will then be counted by the counter 240 to determine the binary value. The threshold for distinguishing the binary values can be set by the counter 240 counting the oscillation periods.

One embodiment may also include a temperature sensor and circuitry implementing a temperature compensation algorithm to account for variations in operating temperature of the device. For example, PUF values may vary with respect to temperature over a range of interest. Thus, the temperature compensation algorithm may account for predictable changes to the PUF values with respect to a stable temperature reference. In addition, although one example of an on chip measurement circuit is depicted and described in connection with FIG. 2, in other, further and different embodiments a measurement circuit may be employed that takes various other forms. For example, a measurement circuit may be employed such as that described in Suh, et al., "Physical Unclonable Functions for Device Authentication and Secret Key Generation", Proceedings of the 44$^{th}$ Design Automation Conference, San Diego, Calif., June 2007, or U.S. patent application Ser. No. 12/032,100, filed Feb. 15, 2008 (Publication No. 2009/0206821 published Aug. 20, 2009), each of which is incorporated by reference herein in its entirety.

As mentioned above, in various embodiments, the variability in properties of a high-k/metal gate is increased using a laser anneal. For example, in one embodiment, a laser anneal process involves the use of an eximer laser to heat the high-k dielectric and/or the substrate (e.g., a Si substrate) to cause re-crystallization of the silicon substrate and/or morphological changes in the high-k dielectric. The changes caused by local heating via the laser leads to variations in the electrical output of the high-k/metal gate device. This results in variations in the measurable properties of the high-k/metal gate device and hence, variation and separation in the binary key values. In one embodiment, the laser anneal comprises the application of a 30 nanosecond ultraviolet laser pulse. In some cases, a laser anneal results in local hotspots, in the high-k dielectric or substrate (at or near the area of excitation), which allows atoms within the silicon and or high-k dielectric material to diffuse and penetrate the layers to various extents. Upon cooling, the subject material(s) recrystallize, fixing dopants in a crystalline lattice, and resulting in a wide range of electrical properties. For instance, recrystallization may occur at or near temperatures of about 1000 degrees Celsius (e.g., 900 to 1200 degrees) for a Si substrate. In some embodiments, the conditions of the laser anneal are purposefully changed to induce variations within the affected layer(s). For example, the exciting laser wavelength, energy, beam width, pulse duration and other laser properties can all be varied (e.g., from one gate stack to the next). In some embodiments, a laser anneal is performed in process, before adding on the layers of the backend to an integrated circuit.

As an alternative, or in conjunction with a laser anneal, variability of one or more components of the high-k/metal gate stack may further be achieved through several other patterning processes, such as lithography, reactive ion etching, or chemical mechanical planarization. For example, aspects of these processes can be varied (e.g., purposefully and/or randomly) from the manufacture of one gate to the next. In still other embodiments, variability is increased by exposing the one or more components of the high-k/metal gate to various ambient conditions during a manufacturing process, such as varying the quantities of available dopant, the types of dopant, the ambient temperature, ambient oxygen levels, and the like. As a result, a wide range of purposeful variations, which may be substantially random, in the physical and electrical properties of the high-k/metal gate can be achieved. This range of variations can be exploited in measuring one or more properties of the high-k/metal gate when used as a physical unclonable function, resulting in more stable keys derived therefrom, and thus less bit errors. In particular, when creating purposeful variation in an array of multiple high-k/metal gates, substantially unique signatures may be derived therefrom.

In addition, in various embodiments a measurement circuit is included on chip (i.e., on or in the same die/substrate as the gates it is measuring). By placing the measurement circuit on chip, it makes it more difficult to probe and access the PUF than where the measurement circuit is not part of the same IC. For example, to access the PUF (i.e., the one or more high-k/metal gates) through delayering, the attacker will need to delayer the measurement circuit in addition to the gate structure(s) themselves. This makes it more likely that the attacker will destroy either one or more of the high-k/metal gates or the measurement circuit. However, the device will not function without both the gate structure(s) and the measurement circuit which derives the signature therefrom. Without the functioning measurement circuit, the attacker will not know how to convert the PUF value(s) to a binary signature. In addition, if the attacker tries to access the high-k/metal gate stacks directly (e.g., through probing) it will inevitably alter the physical properties of one or more components of the gate stack sufficiently enough (e.g., due to exposure to air, light/radiation, etc.) to change the signature and key, thereby rendering the device useless. In other words, to see the measurement circuit or PUF, it is likely that one or the other, or both, will be destroyed in the attack. Accordingly, such embodiments of the present disclosure provide a tamper response. In other words, if an attacker tries to gain physical access to a PUF signature/key by delayering, probing, imaging or other established failure analysis methods, the PUF and/or measurement circuit is altered or even destroyed in such a way as to prevent regeneration of the key. In particular, experimental results show that a high-k/metal gate is particularly susceptible to techniques involving radiation (e.g., TEM). For instance, it has been discovered that there is substantial thickening of a low density oxide layer after even short durations of irradiation with an electron beam (e.g., a 200 kV electron beam). This physical change inevitably leads to a change in the measurable properties of the high-k/metal gate stack, thereby changing the signature and indicating that the device has been tampered with.

In some embodiments, for example in a large array, the location(s) of the high-k/metal gates that are included in the PUF array can be varied, purposefully and/or randomly or otherwise, so that from one device to the next, the location(s) of the PUF are not necessarily the same. Thus, an attacker may not know where to look for a PUF signature going from chip to chip, increasing the difficulty of an attacker's task many-fold.

Figure 3:
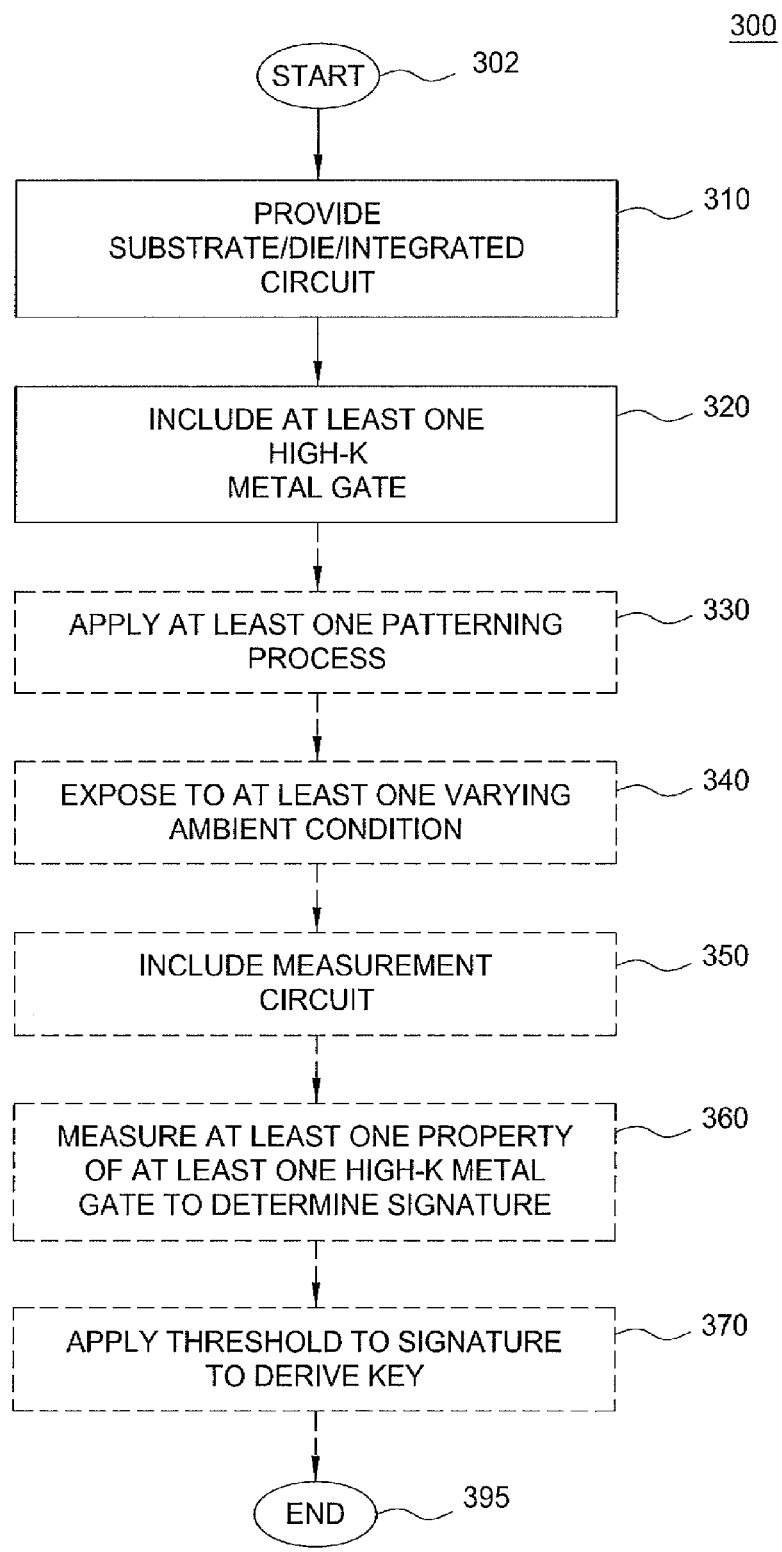
FIG. 3 is a flowchart of a method for manufacturing an exemplary device, according to embodiments of the present disclosure.

FIG. 3 illustrates a flowchart of a method 300 for creating a secure device having a physical unclonable function. In particular, exemplary steps of the method 300 may be performed in accordance with the above described embodiments.

The method 300 begins at step 302 and proceeds to step 310 where the method provides a substrate/die. For example, a substrate/die may be the basis for one or more integrated circuits, each of which may comprise a front end layer of semiconducting silicon, gallium arsenide, germanium and the like, along with other materials and/or combinations thereof, and having formed therein a number of transistors, gates, nets, and the like. The integrated circuit may also comprise a number of backend layers including a dielectric (e.g., a low-k dielectric) or other insulating materials, vias, traces, and wiring connecting various elements in the front end to each other, to ground, and to power sources, among other things. An exemplary integrated circuit is illustrated in FIG. 1 and described above.

At step 320, the method 300 forms at least one high-k/metal gate (or high-k/metal gate device) on the substrate. For example, the high-k/metal gate may be formed using any number of known techniques. For example, a high-k dielectric, gate metal and other components/layers may be deposited using electron beam induced deposition, a focused ion beam induced deposition, sputtering and similar techniques. The high-k dielectric and/or other components of the gate structure may be deposited in structures or on planar silicon formed by well known etching techniques. In addition, the high-k/metal gate may be formed in either a gate-first process or a gate-last process, as is known to those skilled in the art. Accordingly, in some embodiments the at least one high-k/metal gate is added at the same time the given layer is fabricated, before adding any additional layers (e.g., backend layers, protective layers, etc.).

In various embodiments, the at least one high-k/metal gate added at step 320 is used as a physical unclonable function. For example, a measurement circuit can determine various physical properties of the at least one high-k/metal gate and derive a signature and key therefrom. Accordingly, in some cases, steps 330-370 of the method 300 are performed following step 320. However, not all of these steps need be performed in an exemplary process for forming a secure device in accordance with the method 300. Thus, in some embodiments, following step 320 the method 300 proceeds to step 395, where the method ends. However, in some embodiments, the method 300 proceeds to step 330.

At step 330, the method 300 performs at least one patterning process on one or more components of the high-k/metal gate added in step 320. For example, a laser anneal may be performed on the high-k dielectric material of the at least one high-k/metal gate after the high-k dielectric is added/deposited at step 320. In a gate-first process, the method 320 may perform a laser anneal before additional layers are added (e.g., before the gate metal, any backend layers, any protective layers, etc.). While, in some embodiments it is possible to anneal after the other layers are included in the IC (e.g., in a gate-last process). Care must be exercised in not damaging any transistors, nets or other necessary components. As described above, a laser anneal of the high-k dielectric material induces the high-k dielectric to decrystallize and recrystallize in local regions of excitation, and results in varying grain sizes in the high-k dielectric. All of these variations lead to a range of physical properties. In addition, various laser properties can be modified during the anneal including beam width, wavelength, pulse duration, and the like, which leads to much variability in the properties of the high-k dielectric (and hence the resulting high-k/metal gate). In some embodiments, parameters of the laser anneal are varied from one gate to the next when fabricating an array of gates for use as a PUF. For instance, the line width, beam energy and other factors can all be varied in performing anneals on different gates. Further, in some cases the laser anneal is applied to the underlying substrate, or even other layers, in the same manner as described above. This similarly leads to variations is different properties of the affected material (e.g., the underlying substrate) such as changes in the resistivity, and the like. In turn, this affects the variability in the measurable properties (e.g., the PUF value(s)) of a resulting high-k/metal gate.

Alternatively, or in addition, the at least one patterning process applied at step 330 may comprise a lithography process, reactive ion etching, chemical mechanical planarization, one or more CMOS (complementary metal oxide semiconductor) processing techniques, or other processing techniques applied to one or more components of the at least one high-k/metal gate (e.g., the high-k dielectric, the gate metal, substrate, source drain or interfacial later, and the like which comprise the gate). Each of these techniques, alone or in combination, leads to a substantial variability in the measureable properties of a resulting gate. More specifically, parameters for the performance of each of these processes can be varied from manufacturing one high-k/metal gate stack to the next, providing further variability between the different gate stacks used for a PUF.

At step 340, the method 300 exposes one or more components of the at least one high-k/metal gate to one or more additional variability enhancements. For example, the method 300 may expose a high-k dielectric, the substrate, the source/drain or other components of the at least one high-k/metal gate to various quantities of one or more dopants, which may diffuse through the gate component(s) and be bound in a lattice upon recrystallization of a particular affected layer/material. In addition, at step 340 the method 300 may further vary such things as the ambient temperature, ambient oxygen levels, and the like during a fabrication of the structure. For example, exposure to different levels of oxygen result in a range of interfacial layer regrowths in small and large devices, resulting in a larger Tiny (thickness of the inversion layer) and increasing loss of channel control by the gate. In some cases, this is enabled by the oxidation of substrate silicon (Si) at temperatures greater than approximately 500 degrees Celsius from extrinsic oxygen, which may be transported to the active region of a transistor by a hafnium (Hf) based high-k conduit layer, being in intimate contact with an interfacial layer. The increases in Tiny in turn increase Vt of transistors for small length and small width devices upon exposure to part per million (ppm) levels of oxygen at around 400-500 degree Celsius or greater. In one embodiment, local temperatures variations at around 400-450 degrees Celsius or greater may also be applied to the gate metal, which is demonstrated to increase gate leakage in measureable ways. This heating may be induced by localized application of a laser or through other means.

In some embodiments, these variations in ambient conditions are applied at the same time the high-k dielectric is deposited/added at step 320 as part of the formation of the at least one high-k/metal gate, simultaneous with the one or more patterning processes at step 330, or at any other time during a fabrication process. For example, varying the oxygen level at the same time as performing a laser anneal may result in purposeful and/or random patterns of recrystallization that include varying levels of contamination/doping in the high-k dielectric and/or substrate. This range of variations can be exploited in measuring the at least one high-k/metal gate when used as a physical unclonable function, resulting in more stable keys derived therefrom, and thus less bit errors.

Accordingly, in some embodiments, the method 300 proceeds to step 350 where the method includes a measurement circuit on the die provided at step 310. Exemplary measurement circuits are described above in connection with FIGS. 1 and 2.

In some embodiments, following step 350 the method 300 proceeds to step 360 where the method measures at least one physical property of the at least one high-k/metal gate to determine a signature. The measurements may be performed using the measurement circuit added at step 350. Specifically, in some embodiments, the measurement circuit is configured to measure/detect various properties of the at least one high-k/metal gate as described above in connection with the exemplary measurement circuit 200 in FIG. 2 or 120 in FIG. 1. For instance, the method 300 may measure the voltage response (e.g., a threshold voltage (Vt)), inductance response, resistance response, capacitance response, and other properties of the at least one high-k/metal gate added at step 320 in order to derive a signature therefrom. The signature may comprise one or more analog values reflecting the responses of each of the one or more high-k/metal gates to one or more applied signals.

Following step 360, the method 300 may further proceed to step 370 where the method applies a threshold to the signature to derive a key. For example, as mentioned above, the signature of the at least one high-k/metal gate added at step 320 may comprise one or more analog waveforms representing the response(s) of the one or more high-k/metal gates to applied signals. Accordingly, in one embodiment the method 300 derives a signature by using a counter to count the oscillations/period of the voltage controlled oscillator signal, or similar means. In addition, a threshold may be applied, such as shown in the example of FIG. 4, to derive a binary representation. In various embodiments, the set of binary representations that is output forms a key for the integrated circuit which may be used for cryptographic and authentication purposes, among other things. For instance, the key may be stored in random access memory (RAM). Thereafter, a processor may access the key from the RAM in order to perform various computations. Since RAM is volatile, when the device's power is shut off, the key is automatically erased from the RAM. Every time the device/chip is turned on, the key needs to be regenerated (e.g., by way of the method 300). It should be noted that although a binary based key is described, the present disclosure is not so limited. Namely, other, further, and different embodiments may be incorporated in a ternary based system, and the like.

At step 395, the method 300 terminates. Accordingly, the steps of the method 300 produce a secure device comprising an integrated circuit having a physical unclonable function (in the form of one or more high-k/metal gates which may be subject to one or more variability enhancements). In some embodiments, the secure device includes a measurement circuit for purposes of extracting a key from the properties of one or more high-k/metal gate devices that can be used for cryptographic and authentication purposes.

Although particular embodiments have been described above in connection with the method 300 above, it should be noted that other embodiments of the present disclosure are no so limited. For instance, although the method 300 has been described in connection with certain exemplary materials, the method 300 is presented by way of example only and not limitation. Thus, in other, further and different embodiments, at step 320 the method 300 may use alternative materials suitable for use a substrate, high-k dielectric, gate metal, and other components. In addition, although the steps of the method 300 are listed in a particular order, as shown in FIG. 3, it should be noted that alternate embodiments of the present disclosure may implement these steps in a different order.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents. In addition, although various embodiments which incorporate the teachings of the present disclosure have been shown and described in detail herein, those skilled in the art can readily devise many other varied embodiments that still incorporate these teachings.

What is claimed is:

1. A method of manufacturing a secure device having a physical unclonable function, the method comprising:
   providing a substrate for the secure device; and
   forming at least one high-k/metal gate device on the substrate, the at least one high-k/metal gate device representing the physical unclonable function; and
   varying an ambient condition to which the at least one high-k/metal gate device is exposed during the forming, to create a variation in a physical property of the at least one high-k/metal gate device that is measurably unique relative to variations in physical properties of other high-k/metal gate devices manufactured in a onion batch with the at least one high-k/metal gate device and wherein the physical property is known to be sensitive to variations in the ambient condition.

2. The method of claim 1, wherein the at least one high-k/metal gate device comprises a high-k dielectric.

3. The method of claim 2, wherein the high-k dielectric comprises at least one of:
   a lanthanum oxide;
   an alkaline earth oxide; or
   an earth metal oxide.

4. The method of claim 1, wherein the ambient condition comprises at least one of:
   a varying level of an available dopant;
   a varying temperature; or
   a varying level of oxygen.

5. The method of claim 1, further comprising:
   performing at least one patterning process on the at least one high-k/metal gate device to alter the variation, wherein the at least one patterning process comprises at least one of:
   a laser anneal;
   a lithography process;
   a reactive ion etching process; or
   a chemical mechanical planarization process.

6. The method of claim 1, further comprising:
   including a measurement circuit in the secure device, wherein the measurement circuit is configured to measure the physical property of the at least one high-k/metal gate device for authenticating the secure device.

7. The method of claim 6, wherein the physical property comprises at least one of:
   a resistance;
   a capacitance;
   an impedance;
   an inductance;
   a transmittance; or
   a voltage response.

8. The method of claim 7, wherein a signature having one or more physical unclonable function values is derived from the physical property.

9. The method of claim 8, wherein the measurement circuit is further configured to:
derive a binary key from the signature, wherein the binary key is derived from the signature via the measurement circuit by applying a threshold to the one or more physical unclonable function values.

10. The method of claim 6, wherein the measurement circuit is formed on the substrate.

11. The method of claim 1, wherein the secure device comprises an integrated circuit.

12. A method of manufacturing a secure device having a physical unclonable function, the method comprising:
providing an integrated circuit comprising at least one high-k/metal gate device, the at least one high-k/metal gate device representing the physical unclonable function;
varying an ambient condition to which the at least one high-k/metal gate device is exposed during the forming, to create a variation in a physical property of the at least one high-k/metal gate device that is measurably unique relative to variations in physical properties of other high-k/metal gate devices manufactured in a common batch with the at least one high-k/metal gate device, and wherein the physical property is known to be sensitive to variations in the ambient condition; and
including a measurement circuit in the integrated circuit that is configured to measure the physical property of the at least one high-k/metal gate device for authenticating the secure device, wherein the at least one property is affected by the unique variation.

13. The method of claim 12, wherein the at least one high-k/metal gate device comprises a high-k dielectric.

14. The method of claim 12, wherein the ambient condition comprises at least one of:
a varying level of an available dopant;
a varying temperature; or
a varying level of oxygen.

15. The method of claim 12, further comprising:
performing at least one patterning process on the at least one high-k/metal gate device to alter the variation, wherein the at least one patterning process comprises at least one of:
a laser anneal;
a lithography process;
a reactive ion etching process; or
a chemical mechanical planarization process.

16. The method of claim 12, wherein the physical property comprises at least one of:
a resistance;
a capacitance;
an impedance;
an inductance;
a transmittance; or
a voltage response.

17. A secure device having a physical unclonable function, the secure device comprising:
a substrate;
at least one high-k/metal gate device formed on the substrate, the at least one high-k/metal gate device representing the physical unclonable function and formed using a variability enhancement that varies an ambient condition to which the at least one high-k/metal gate device is exposed during manufacture, wherein a physical property of the at least one high-k/metal gate device is known to be sensitive to variations in the ambient condition; and
a measurement circuit configured to measure at least one property of the at least one high-k/metal gate device for authenticating the secure device.

18. The secure device of claim 17, wherein the at least one high-k/metal gate device comprises a high-k dielectric.

19. The secure device of claim 17, wherein the ambient condition comprises at least one of:
a varying level of an available dopant;
a varying temperature; or
a varying level of oxygen.

20. A secure device having a physical unclonable function, the secure device comprising:
a substrate; and
at least one high-k/metal gate device formed on the substrate, the at least one high-k/metal gate device representing the physical unclonable function and formed using a variability enhancement that varies an ambient condition to which the at least one high-k/metal gate device is exposed during manufacture, wherein a physical property of the at least one high-k/metal gate device is known to be sensitive to variations in the ambient condition.

21. The secure device of claim 20, wherein the at least one high-k/metal gate device comprises a high-k dielectric.

22. The secure device of claim 20, wherein the ambient condition comprises at least one of:
a varying level of an available dopant;
a varying temperature; or
a varying level of oxygen.

23. The secure device of claim 20, further comprising:
a measurement circuit located on the substrate, wherein the measurement circuit is configured to measure the physical property of the at least one high-k/metal gate device for authenticating the secure device.

* * * * *